July 22, 1969 J. H. WISNIEWSKI 3,457,395

SINE-COSINE FUNCTION GENERATOR

Filed March 2, 1967 4 Sheets-Sheet 1

INVENTOR.
JACOB H. WISNIEWSKI

BY George C. Sullivan

Agent

INVENTOR.
JACOB H. WISNIEWSKI
BY George C. Sullivan
Agent

INVENTOR.
JACOB H. WISNIEWSKI

BY George C. Sullivan
Agent

INVENTOR.
JACOB H. WISNIEWSKI
BY George C. Sullivan
Agent

United States Patent Office 3,457,395

Patented July 22, 1969

3,457,395

SINE-COSINE FUNCTION GENERATOR

Jacob H. Wisniewski, Palo Alto, Calif., assignor to Lockheed Aircraft Corporation, Burbank, Calif.

Filed Mar. 2, 1967, Ser. No. 620,114
Int. Cl. G06g 7/22
U.S. Cl. 235—189 13 Claims

ABSTRACT OF THE DISCLOSURE

The sine-cosine function generator of the present invention is an electronic device, which produces in the output thereof three D.C. voltage signals, the magnitudes of which are described by K sine αV, K cosine αV, and K sine αV, wherein V is a D.C. control voltage, K is a constant and α is a selected constant angle. Toward this end, a sine wave is sampled at three points which are located precisely ninety electrical degrees apart with respect to the sine wave period. The three sample times are fixed with respect to each other, as determined by fixed delay circuits, and are simultaneously variable with respect to a range of interest of the sine wave by means of a variable delay circuit, which is controlled by an external control voltage.

The present invention relates in general to direct current generators, and more particularly to a sine-cosine function generator.

Heretofore, multitap potentiometers with multiple sliding contacts were employed to produce three D.C. output signals with magnitudes of K sine αV, K cosine αV and –K αV. It has been found that the characteristics of the output signals of such sine-cosine potentiometers were not sufficiently accurate. Furthermore, the phase relationship between the output signals of the sine-cosine potentiometers had a drift factor and did not remain adequately constant. Also, the sine-cosine potentiometer presented a high impedance to the succeeding stage.

Accordingly, an object of the present invention is to provide an electronic direct current generator to produce D.C. voltage output signals with magnitudes of K sine αV, K cosine αV and –K sine αV.

Another object of the present invention is to provide a direct current generator to produce D.C. voltage signals with magnitudes of K sine αV, K cosine αV and –K sine αV that has greater accuracy in the output values thereof.

Another object of the present invention is to provide a sine-cosine function generator that has reduced drifting in the phase relationship between the timing signals thereof and that maintains a substantially constant phase relationship between the timing signals thereof.

Another object of the present invention is to provide a sine-cosine function generator that presents a low output impedance.

Another object of the present invention to to provide a sine-cosine function generator in which the voltage characteristics of the output signals thereof are controlled by a direct current control voltage.

Other and further objects and advantages of the present invention will be apparent to one skilled in the art from the following description taken in conjunction with the accompanying drawings, in which.

Figure 1:
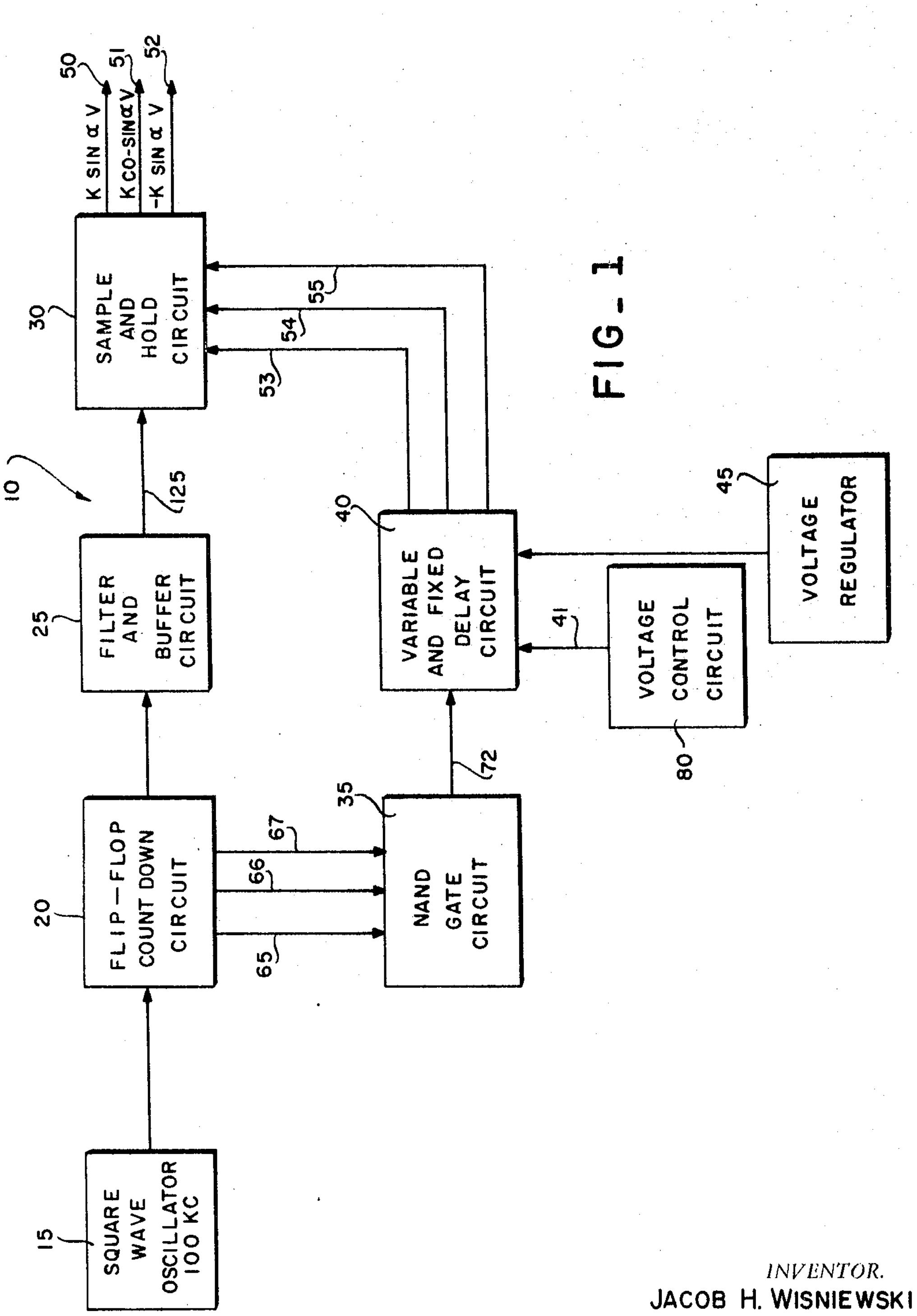
FIGURE 1 is a block diagram of the sine-cosine function generator of the present invention.

Illustrated in FIGURE 1 is the sine-cosine function generator 10 of the present invention which comprises a conventional square wave oscillator 15 that produces a square wave signal. In the exemplary embodiment, the output signal of the oscillator 15 has a frequency of 100 kilocycles. Connected to the output of the oscillator 15 is a well known flip-flop countdown circuit 20 which includes, in the preferred embodiment, three conventional flip-flop binary counter circuits. In the exemplary embodiment of the present invention, the output signal of the flip-flop countdown circuit 20 is a square wave signal of a frequency of 12.5 kilocycles.

Figure 2:
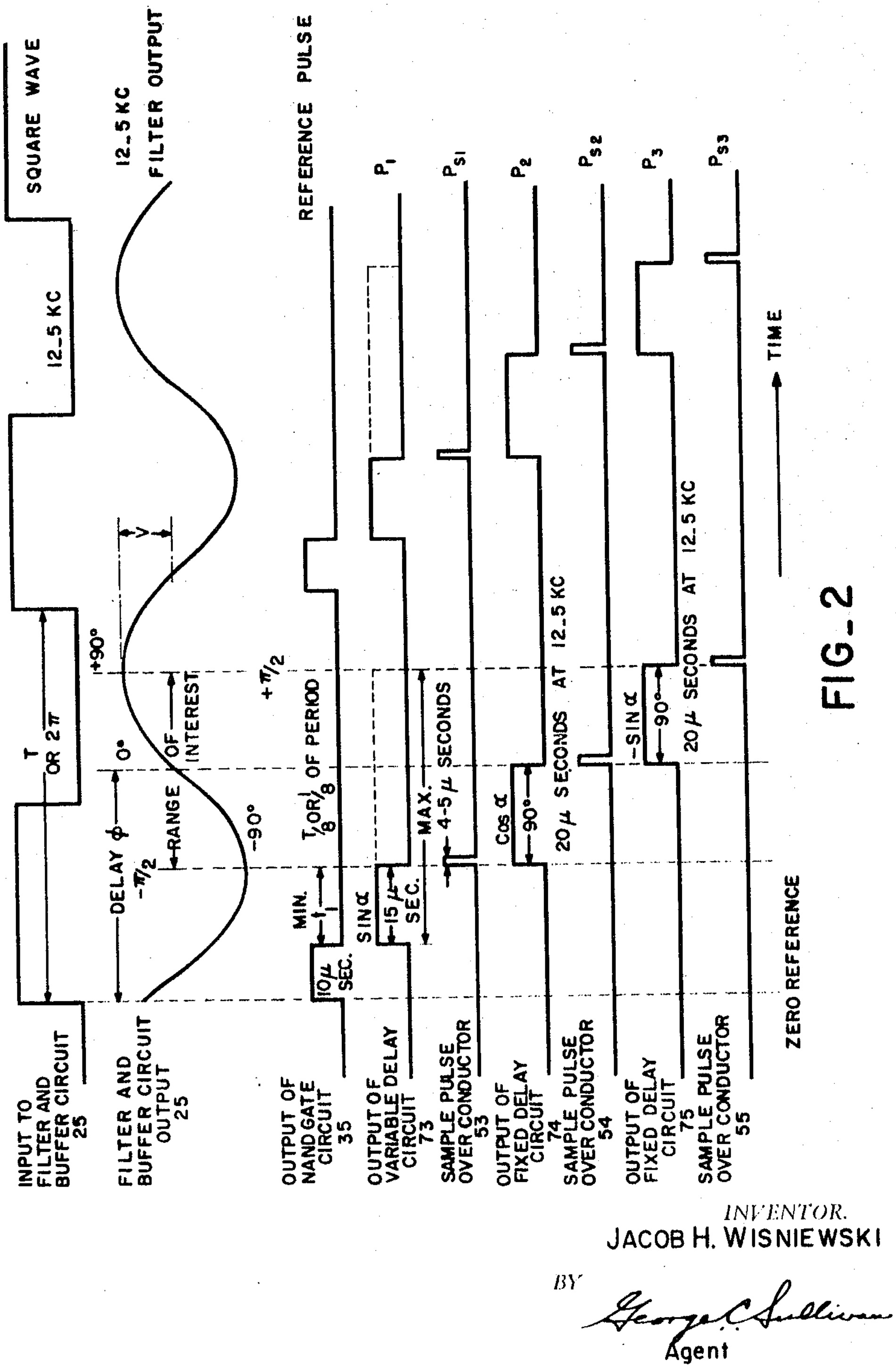
FIGURE 2 is a diagrammatic illustration of the various waveforms for the signals employed in the sine-cosine function generator shown in FIGURE 1 along with the timing relationship therebetween.

The output signal of the flip-flop countdown circuit 20 is fed to a conventional low pass filter and buffer circuit 25, which converts the square wave signal into a sine wave signal of the same frequency. There is a constant phase relationship or delay between the square wave input signal fed to the input of the low pass filter and buffer circuit 25 and the sine wave signal produced in the output of the low pass filter and buffer circuit 25 (FIGURE 2). The phase relationship is constant because of the transfer function of the low pass filter.

A sample and hold circuit 30 receives the sine wave output signal from the filter and buffer circuit 25 and samples the sine wave signal at three selected points therealong spaced successively in time ninety electrical degrees apart. Thus, the sine wave output signal of the filter and buffer circuit 25 is sampled by the sample and hold circuit 30 through short duration sampling pulses.

To produce the short duration sampling pulses, reference pulses originate from the square wave pulses produced by the respective flip-flop binary counter circuits of the flip-flop countdown circuit 20. The reference pulses from the flip-flop countdown circuit 20 are transmitted to a well-known nand-gate circuit 35, which produces a reference square wave pulse. The nand-gate circuit 35 changes its state to produce an output pulse when all the flip-flop counter circuits are simultaneously generating a pulse output. In the exemplary embodiment, the reference pulse produced in the output of the nand-gate circuit 35 is a square wave pulse with a duration of T/8 or a duty cycle of ⅛ at a repetition rate of 12.5 kilocycles per second, wherein T represents the sine wave period of the signal produced in the output of the filter and buffer circuit 25.

Connected to the output of the nand-gate circuit 35 to receive the reference square wave pulse signal therefrom is a variable and fixed delay circuit 40. The three short duration sampling pulses transmitted to the sample and hold circuit 30 are located precisely ninety electrical degrees apart with respect to the sine wave period of the output signal from the filter and buffer circuit 25 by means of the fixed delay circuits of the variable and fixed delay circuit 40, and are variably spaced within a region of interest with respect to the aforementioned sine wave signal by means of a variable delay circuit of the variable and fixed delay circuit 40. The variable time delay is under the control of an external D.C. control voltage applied over a conductor 41. A suitable voltage regulator 45 is connected to the fixed delay circuit of the variable and fixed delay circuit 40.

In the output of the sample and hold circuit 30 are produced continuously three D.C. output signals over conductors 50–52, respectively, with amplitudes described as follows: *k* sine αV, K cosine αV and —K sine αV, wherein K is a constant, α is a selected constant angle and V is the amplitude of a direct current control voltage. It is the ability to place the sampling pulses over the range of interest shown in FIGURE 2 as π/—2 to π/+2 that enables the amplitude of the D.C. output signals transmitted over the conductors 50–52, respectively, to be proportional to the sine and cosine of any selected constant angle. This is accomplished by regulating the output voltage of the voltage control circuit 80 and thereby regulating the operation of the variable delay circuit of the variable and fixed delay circuit 40.

The reference pulses generated by combining the flip-flop countdown output pulses fed to the nand-gate circuit 35 are precisely timed in phase relationship with the sine wave output of the filter and buffer circuit 25 in a manner previously described.

Using the falling edge of the square wave pulse produced in the output of the nand-gate circuit 35 as a reference, the variable and fixed delay circuit 40 generates a pulse $P_1$ (FIGURE 2) having a variable width with the minimum width $t_1$ and the maximum width $t_1+T/2$. The falling edge of the pulse $P_1$ is followed by a short duration sampling pulse $Ps_1$ has a pulse width in the range of .4 to .5 microseconds. In this manner, a sampling pulse may be located at selected points with a range of interest to obtain a D.C. voltage of $V_1=K$ sine $\alpha$ with $$-\frac{\pi}{2}\leq\alpha\leq+\frac{\pi}{2}$$

Thereupon, the falling edge of the pulse $P_1$ is employed as a reference and initiates a pulse $P_2$ (FIGURE 2) with a time width or pulse duration of T/4 or $\pi/2$ or 90° at 12.5 kilocycles per second. The falling edge of the pulse $P_2$ is followed by a sort duration sampling pulse $Ps_2$ (FIGURE 2), which is transmitted over the conductor 54 to the sample and hold circuit 30. In the preferred embodiment, the short duration sampling pulse $Ps_2$ has a pulse width in the range of .4 to .5 microseconds. In this manner, a sampling pulse $Ps_2$ may be located at selected points within the range of interest and spaced precisely 90° from the sampling pulse $Ps_1$ to obtain a D.C. voltage of $V=K$ sine $(\alpha+\pi/2)=K$ cosine $\alpha$.

Lastly, the falling edge of the pulse $P_2$ is employed as a reference pulse and initiates a pulse $P_3$ (FIGURE 2) with a time width or pulse duration of T/4 or $\pi/3$ or 90 degrees at 12.5 kilocycles per second. The falling edge of the pulse $P_3$ is followed by a short duration sampling pulse $Ps_3$ (FIGURE 2), which is fed over the conductor 55 to the sample and hold circuit 30. In the exemplary embodiment, the short duration sampling pulse $Ps_3$ has a pulse width in the range of .4 to .5 microseconds. In this manner, a sampling pulse may be located at related points within the range of interest and spaced precisely 90 degrees from the sampling pulse $Ps'_2$ to obtain a D.C. voltage of $V_3=K$ cosine $(\alpha+\pi/2)=-K$ sine $\alpha$.

Figure 3A:
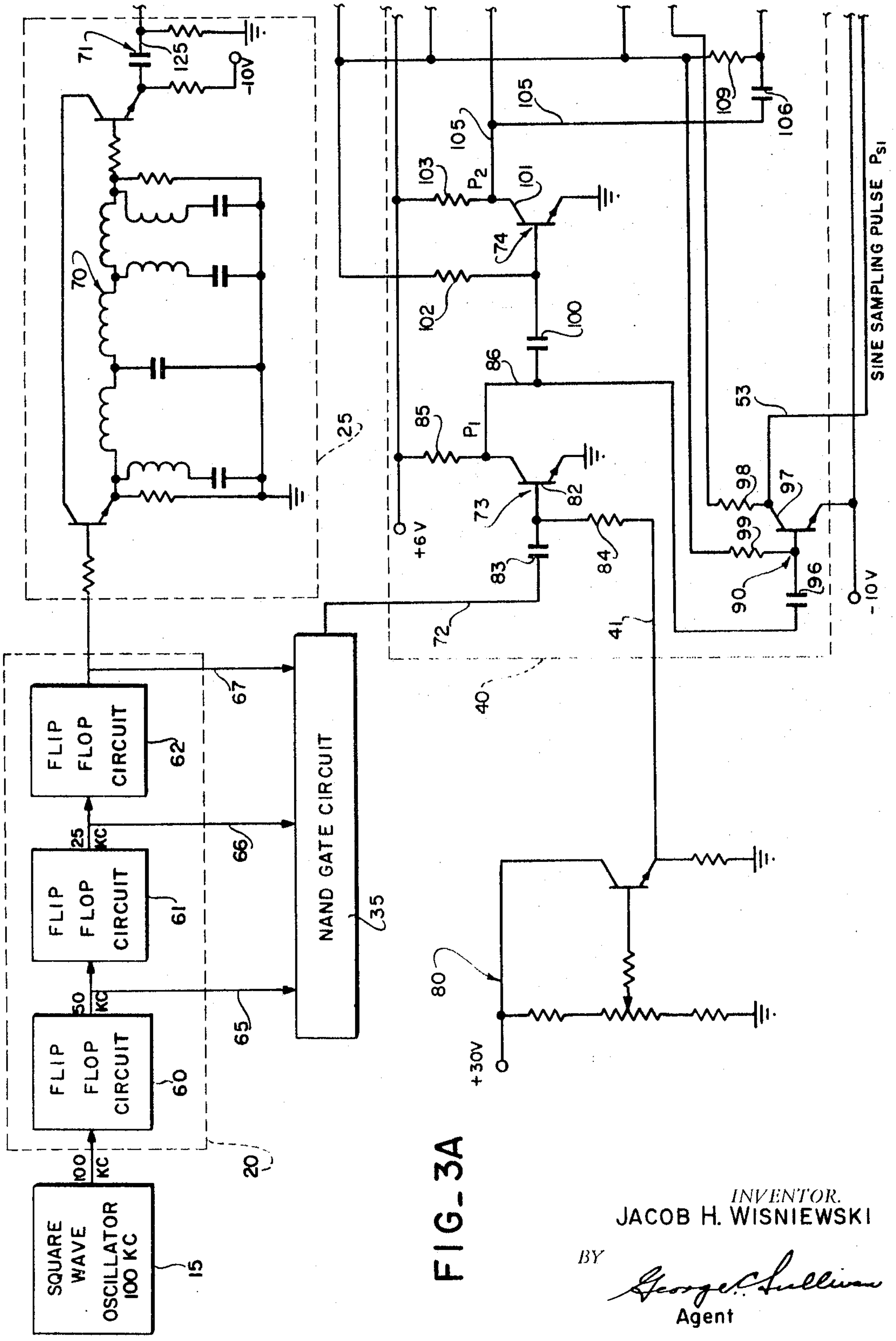
FIGURES 3 and 3B are a schematic diagram of the sine-cosine function generator of the present invention.
Figure 3B:
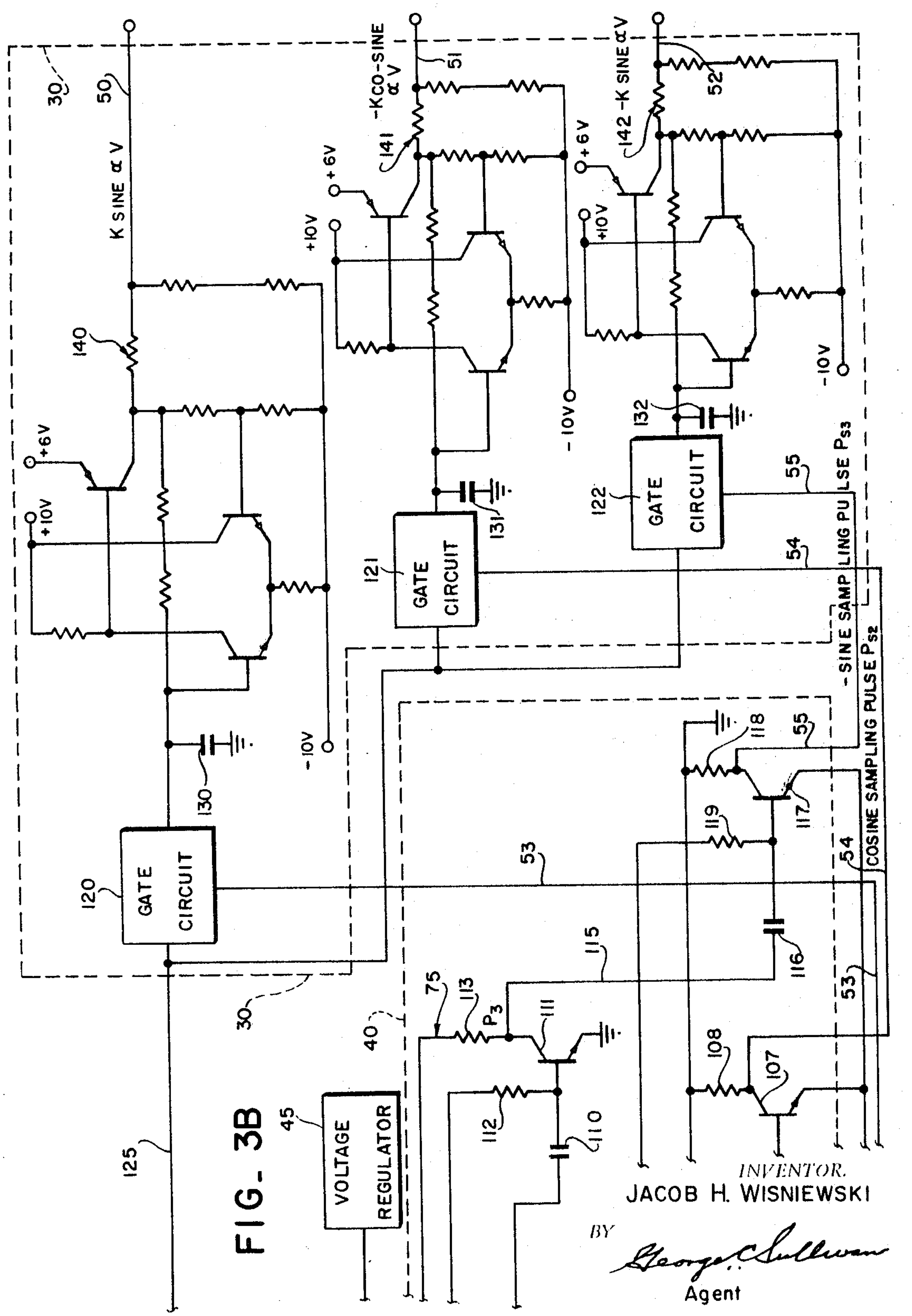

Referring now to FIGURE 3 for a detailed description of the sine-cosine function generator 10, the square wave oscillator 15 may be of the well-known and conventional type to function as an accurate square wave generator. Such an oscillator would be in the form of a conventional free-running or an astable multivibrator. In the exemplary embodimentof the present invention, the output signal produced by the oscillator 15 is an accurately controlled 100 kilocycle per second square wave signal.

The output of the square wave oscillator 15 is fed to the well-known flip-flop countdown circuit 20, which, in the exemplary embodiment, includes three conventional flip-flop binary counter circuits 60–62. As shown in FIGURE 3, the flip-flop binary counter circuits 60–62 are connected in cascade or in series to form a chain countdown arrangement. Hence, the flip-flop binary counter circuit 60 receives from the oscillator 15 a square wave signal having a frequency of 100 kilocycles per second and produces in the output thereof, in a well- known manner, a signal of one-half of the frequency of the input signal. Thus, the output signal of the flip-flop binary counter 60 is 50 kilocycles per second. The output signal is fed to the succeeding flip-flop binary counter circuit 61 and is also transmitted to the nand-gate circuit 35 over a conductor 65.

In a similar manner, the flip-flop binary counter 61 receives from the flip-flop binary counter 60 a square wave signal having a frequency of 50 kilocycles per second and produces in the output thereof a signal of one half of the frequency of the input signal. Therefore, the output signal of the flip-flop binary counter 61 is 25 kilocycles per second. The output signal from the flip-flop binary counter 62 is advanced to the succeeding flip-flop binary counter 63 and is also transmitted to the nand-gate circuit 35 over a conductor 66.

Likewise, the flip-flop binary counter 62 receives from the flip-flop binary counter 61 a square wave signal having a frequency of 25 kilocycles per second and produces in the output thereof a signal of one half of the frequency of the input signal. Accordingly, the output signal of the flip-flop binary counter 62 is 12.5 kilocycles per second. Now, the output signal from the flip-flop binary counter 62 is fed to the low pass filter and buffer circuit 25 and is also transmitted to the nand-gate circuit 35 over a conductor 67.

The low pass filter and buffer circuit 25 comprises a low pass filter 70 and a buffer circuit 71. The low pass filter 70, which is a constant $k$ three section $m$-derived filter, serves to convert the square wave signal of 12.5 kilocycles frequency fed into the input thereof into a sine wave signal of 12.5 kilocycle frequency produced in the output thereof, which is transmitted to the buffer circuit 71. The filter 70 is arranged to produce in its output a sine wave signal with a constant or fixed phase shift relationship with respect to the square input signal. By virtue of the transfer constant of the filter 70, the phase shift relationship between the input and output signals of the filter 70 is maintained constant. The buffer 71 serves to isolate the filter 70 from the input circuit of the sample and hold circuit 30 and to provide a low output impedance source.

As previously described, the square wave signals produced in the output circuits of the flip-flop binary counter circuits 60–62 are transmitted to the conventional nand-gate 35 over the conductors 65–67, respectively. The nand-gate circuit 35 changes its state to produce an output pulse when the flip-flop counter circuits 60–62 generate simultaneously output pulses. As a consequence thereof, the output signal produced by the nand-gate circuit 35 is a reference square wave signal with a pulse width of $T/8$ at a repetition rate of 12.5 kilocycles per second and with a duty cycle of ⅛ (see FIGURE 2), where T represents the period of the sine wave signal produced in the output of the filter circuit 70.

It is observed from FIGURE 2 that the input square wave signal to the filter and buffer circuit 25 is of the same period as the output sine wave frequency from the filter and buffer circuit 25. The reference pulse signal transmitted from the nand-gate circuit 35 over a conductor 72 is of the same period as the input square wave signal fed to the filter and buffer circuit 25 and also of the same period as the output square wave signal produced in the output of the filter and buffer circuit 25. However, the pulse width or duration of the reference output pulse fed from the nand-gate circuit 35 over the conductor 72 is, in the exemplary embodiment, 10 microseconds or $T/8$.

Connected to the nand-gate circuit 35 over the conductor 72 is the variable and fixed delay circuit 40, which comprises a variable delay circuit 73 and fixed delay circuits 74 and 75. A voltage control circuit 80 impresses an adjustable control voltage on the variable delay circuit 73 over the conductor 41.

Included in the variable delay circuit 73 is a capacitor 83 that is charged by the square wave pulses transmitted over the conductor 72 from the nand-gate circuit 35. A normally conducting transistor 82 has its base electrode connected to the capacitor 83. Connected between the capacitor 83 and the base electrode of the transistor 82 is the adjustable voltage control circuit 80 through a resistor 84 and over the conductor 72. As the square wave pulse transmitted over the conductor 72 arises, the capacitor 83 charges almost instantaneously to the potential applied to the output circuit of the nand-gate circuit 35 through the emitter electrode of the conducting transistor 82 and through the output circuit of the nand-gate circuit 35. The capacitor 83 continues to charge until the reference pulse transmitted over the conductor 72 falls. Thereupon, the transistor 82 is cut off and the capacitor 83 begins to discharge through the resistor 84 and the voltage control circuit 80.

After a time delay determined by the RC time constant of the resistor 84 and the capacitor 83, which is the discharge time for the capacitor 83, the transistor 82 returns to its initial normally conducting state. When the charge on the capacitor 83 is reduced to a potential close to zero, the transistor 82 begins to conduct. As a result thereof, a square wave pulse $P_1$ is produced across the resistor 85 that begins with the fall of the reference pulse, and the pulse width thereof is varied and is regulated by controlling the output voltage of the voltage control circuit 80, by having the output voltage thereof adjustable, enables the pulse width of the reference pulse $P_1$ to be regulated.

Now, the output pulse $P_1$ produced by a variable delay circuit 73 of the fixed and variable delay circuit 40 and transmitted to a succeeding fixed delay circuit 74 of the variable and fixed delay circuit 40 over a conductor 86 is of the same period as the aforementioned reference signal transmitted over the conductor 72 from the nand-gate circuit 35. However, the delay time between the output reference pulse from the nand-gate circuit 35 over the conductor 72 and the output pulse $P_1$ produced by the variable delay circuit 73 is at a minimum when the falling edge of the pulse $P_1$ is coincident with the $-\pi/2$ point of the sine wave and is at a maximum when the falling edge of the pulse $P_1$ is coincident with the $+\pi/2$ point of the sine wave.

Also connected to the conductor 86 is a fixed delay circuit 90 of the circuit 73, which comprises a capacitor 96. The capacitor 96 is charged by the square wave pulse $P_1$ transmitted over the conductor 86. A normally conducting transistor 97 has its base electrode connected to the capacitor 96. Connected between the capacitor 96 and the base electrode of the transistor 97 through a resistor 99 is the fixed potential voltage regulator 45. As the square wave pulse $P_1$ rises, the capacitor 96 charges almost instantaneously to the potential applied to the collector electrode of the transistor 82 through the resistor 85. The charge path for the capacitor 96 is through the base emitter junction of the transistor 97 and the resistor 85. The capacitor 96 continues to charge until the reference pulse $P_1$ falls. Thereupon, the transistor 97 is cut off and the capacitor 96 discharges through the resistor 99 and the conducting transistor 82.

After a time delay determined by the RC time constant of the resistor 99 and the capacitor 96, which is the discharge time for the capacitor 96, the transistor 97 returns to its initial normally conducting state. When the charge on the capacitor 96 is reduced to a potential close to zero, the transistor 97 begins to conduct. As a result thereof, a square wave pulse is produced across the resistor 98. The pulse produced across resistor 98 is a sine-sampling pulse $Ps_1$ which can be variably located within the range of interest.

The fixed delay circuit 74 includes a capacitor 100, which is connected to the conductor 86 and is charged when the pulse $P_1$ rises. Also, connected to the capacitor 100 is the base electrode of a normally conducting transistor 101. The voltage regulator 45 is connected through a resistor 102 intermediate the capacitor 100 and the base electrode of the transistor 101. A load resistor 103 connects the collector electrode of the transistor 101 to the positive D.C. potential conductor.

As the pulse signal $P_1$ rises, the capacitor 100 charges substantially instantaneously to the potential applied to the collector electrode of the transistor 82 through the resistor 85 and the emitter electrode of the transistor 101. The capacitor 100 continues to charge until the reference voltage $P_1$ falls. Thereupon, the transistor 101 is cut off and the voltage charge on the capacitor 100 discharges through the resistor 102 of the normally conducting transistor 82.

After a time delay determined by the RC time constant of the resistor 102 and the capacitor 100, which is the discharge time for the capacitor 100, the transistor 101 returns to its initial normally conducting state. When the charge on the capacitor 100 is reduced to a potential close to zero, the transistor 101 begins to conduct. As a result thereof, a square wave pulse $P_2$ is produced across a load resistor 103. The pulse $P_2$ has its rise coincident with the fall of the pulse $P_1$.

As shown in FIGURE 2, the time duration of the pulse $P_2$ is such that it falls 90 electrical degrees after the fall of the pulse $P_1$. In the exemplary embodiment the width of the pulse $P_2$ is 20 microseconds. The time duration and the delay of the 90 electrical degrees is based on the period of the sine wave signal produced by the filter circuit 70. The pulse $P_2$ is transmitted over a conductor 105 to a fixed delay circuit 75 and also to a capacitor 106 of the fixed delay circuit 74.

The capacitor 106 is connected to the load resistor 103 to be charged almost instantaneously by the rise of the pulse $P_2$ produced thereacross. Also connected to the capacitor 106 is the base electrode of a normally conducting transistor 107. A load resistor 108 connects the collector electrode of the transistor 107 to ground. As the pulse signal $P_2$ rises, the capacitor 106 charges to the potential applied to the collector electrode of the transistor 101 through the resistor 103 over a path including the emitter electrode of the transistor 107. The capacitor 106 continues to charge until the pulse $P_2$ falls. Thereupon, the transistor 107 is cut off and the voltage charge on the capacitor 106 begins to discharge through the normally conducting transistor 101 and a resistor 109, which is connected to the voltage regulator 45.

After a time delay determined by the RC time constant of the resistor 109 and the capacitor 106, which is the discharge time for the capacitor 106, the transistor 107 returns to its normally conducting state. When the charge on the capacitor 106 is reduced to a potential close to zero, the transistor 107 begins to conduct. The resistance-capacitance network of the resistor 109 and the capacitor 106 is such that the cosine sampling pulse $Ps_2$ produced across the resistor 108 has a pulse width of .4 to .5 microseconds. The rise of the cosine sampling pulse $Ps_2$ is coincident with the fall of the pulse $P_2$. The cosine sampling pulse $Ps_2$ is transmitted to the sample and hold circuit 30 over the conductor 54 and is timed to produce a sampling pulse precisely 90 electrical degrees after the sampling pulse $Ps_1$ is generated.

The fixed delay circuit 75 includes a capaictor 110, which is connected to the conductor 105 and is charged when the pulse $P_2$ rises. Also, connected to the capacitor 110 is the base electrode of a normally conducting transistor 111. The voltage regulator 45 is connected through a resistor 112 intermediate the capacitor 110 and the base electrode of the transistor 111. A load resistor 113 connects the collector electrode of the transistor 101 to the positive D.C. potential conductor.

As the pulse signal $P_2$ rises, the capacitor 110 charges to the potential applied to the collector electrode of the transistor 101 through the resistor 103 and a path including the emitter electrode of the transistor 111. The capacitor 110 continues to charge until the voltage $P_2$ falls. Thereupon, the transistor 111 is cut off and the voltage charge on the capacitor 110 begins to discharge through the normally conducting transistor 101 and the resistor 112.

After a time delay determined by the RC time constant of the resistor 112 and the capacitor 110, which is the discharge time for the capacitor 110, the transistor 111 returns to its initial normally conducting state. When the charge on the capacitor 110 is reduced to a potential close to zero, the transistor 111 begins to conduct. As a result thereof, a square wave pulse $P_3$ is produced across the load resistor 113.

As shown in FIGURE 2, the time duration of the pulse $P_3$ is such that it falls precisely 90 electrical degrees after the fall of the pulse $P_2$. In the exemplary embodiment, the width of the pulse $P_3$ is 20 microseconds. The time duration and the delay of 90 electrical degrees is based on the period of the sine wave fed to the sample and hold circuit 30. The pulse $P_3$ is transmitted over a conductor 115 to a capacitor 116 of the fixed time delay circuit 75.

The capacitor 116 is connected to the load resistor 113 to be charged by the rise of the pulse $P_2$ produced thereacross. Also, connected to the capacitor 116 is the base electrode of a normally conducting transistor 117. A load resistor 118 connects the collector electrode of the transistor 117 to ground. As the pulse signal $P_3$ rises, the capacitor 116 charges substantially instantaneously to the potential applied to the collector electrode of the transistor 111 through the resistor 113 and through the emitter electrode of the transistor 117. The capacitor 116 continues to charge until the pulse $P_3$ falls. Thereupon, the transistor 117 is cut off and the voltage charge on the capacitor 116 begins to discharge through the normally conducting transistor 111 and a resistor 119, which is connected to the voltage regulator 45.

After a time delay determined by the RC time constant of the resistor 119 and the capacitor 116, which is the discharge time for the capacitor 116, the transistor 117 returns to its normally conducting state. When the charge on the capacitor 116 is reduced to a potential close to zero, the transistor 117 begins to conduct. The resistance-capacitance network of the resistor 119 and the capacitor 116 is such that the —sine sampling pulse $Ps_3$ produced across the resistor 118 has a pulse width of .4 to.5 microsecond. The rise of the —sine sampling pulse $Ps_3$ is coincident with the fall of the reference pulse $P_3$. The —sine sampling pulse $Ps_3$ is transmitted to the sample and hold circuit 30 over the conductor 55 and is timed to produce a sampling pulse precisely 90 electrical degrees after the generation of the sampling pulse $Ps_3$.

The sine wave signal produced in the output of the filter and buffer circuit 25 and the sampling pulses $Ps_1$, $Ps_2$ and $Ps_3$ are transmitted to the sample and hold circuit 30. The sample and hold circuit 30 comprises three conventional gating circuits 120–122. All of the input circuits of the gating circuits 120–122 are connected to a common conductor 125 over which is transmitted the sine wave signal output from the filter and buffer circuit 25. Thus, the sine wave signal from the filter and buffer circuit 25 is transmitted simultaneously to the input circuits of the gating circuits 120–122.

Connected to the gating circuits 120–122, respectively, are the conductors 53–55, over which are transmitted, respectively, the sampling pulses $Ps_1$, $Ps_2$ and $Ps_3$.

Each gating circuit 120–122 is in the form of serially connected field-effect transistors normally biased to cutoff. The path for the advancement of the sine wave signal from the filter and buffer circuit 25 is through the source and drain electrodes of the field-effect transistors. Normally, the field-effect transistors are non-conducting and, hence, the sine wave signal does not advance therethrough.

The field-effect transistors include gate electrodes. It is the potential on the associated gate electrodes that controls the conduction of the field-effect transistors. It is the conductors 53–55 that are connected to the gate electrodes, respectively, of the gating circuits 120–122, respectively. Thus, when the sampling pulse $Ps_1$ is transmitted over the conductor 53, the gating circuit 120 conducts to advance therethrough the sine wave signal from the filter and buffer circuit 25 during the pulse width time of the sampling pulse $Ps_1$. Thus, the sine wave signal is sampled, in the exemplary embodiment, for a .4 to .5 microwave duration. In a manner previously described, the sampling pulse $Ps_1$ can be located anywhere within the range of interest.

When the sampling pulse $Ps_2$ is transmitted over the conductor 54, the gating circuit 121 conducts to advance therethrough the sine wave signal from the filter and buffer circuit 25 during the pulse width time of the sampling pulse $Ps_2$. Hence, the sine wave signal is sampled, in the preferred embodiment, for a duration of .4 to .5 microsecond. The sampling initiated from the pulse $Ps_2$ is always 90 electrical degrees out of phase with the sampling pulse $Ps_1$, which may be adjusted within the range of interest.

As the sampling pulse $Ps_3$ is transmitted over the conductor 55, the gating circuit 122 conducts to advance therethrough the sine wave signal transmitted over the conductor 125 from the filter and buffer circuit 25 during the pulse width time of the sampling pulse $Ps_3$. In the preferred embodiment, the sampling of the sine wave signal is for a time duration of .4 to .5 microsecond. The sampling initiated from the pulse $Ps_3$ is always 90 electrical degrees out of phase with the sampling initiated by the sampling pulse $Ps_2$.

Connected to the outputs of the gating circuits 120–122, respectively, are capacitor 130–132. While the gating circuit 120 conduts, the capacitor 130 is charged to the sampled voltage. Similarly, the capacitor 131 charges to the sampled voltage, while the gating circuit 121 conduts. Likewise, the conducting of the gating circuit 122 charges the capacitor 132 to the sampled voltage.

Conventional D.C. amplifiers 140–142 are connected to the capacitors 130–132, respectively. The D.C. amplifiers 140–142, in the preferred embodiment, have a gain of 1 and apply constant D.C. voltages on the conductors 50–52, respectively. This results in constant D.C. voltages being impressed on the conductors 50–52, respectively, which are described as follows: $V_1=K$ sine $\alpha$V; $V_2=K$ cosine $\alpha$V; $V_3=-K$ sine $\alpha$V.

The angle $\alpha$ is varied by regulating the control voltage applied to the conductor 41 from the voltage control circuit 80, which varies the location of the sampling pulse $Ps_1$ within the range of interest of the sampled sine wave signal. In this manner, the magnitude of the D.C. voltages impressed on the conductors 50–52, respectively, is regulated and maintained constant.

In the operation of the sine-cosine function generator 10, the square wave oscillator 15 produces a square wave signal with a frequency of 100 kilocycles per second. The square wave signal is fed to the flip-flop count-down circuit 20.

Included in the flip-flop countdown circuit 20 are the three flip-flop binary counter circuits 60–62. The flip-flop counter circuit 60 receives the square wave signal from the oscillator 15 and produces a square wave signal with a frequency of 50 kilocycles per second for transmission to the nand-gate circuit 35 and the succeeding flip-flop counter circuit 61. In turn, the flip-flop counter circuit 61 receives the 50 kilocycle per second square wave signal and produces in its output a square wave signal with a frequency of 25 kilocycles per second for transmission to the nand-gate circuit 35 and the succeeding flip-flop counter circuit 62. Lastly, the flip-flop counter circuit 62, in response to receiving the square wave signal with a frequency of 25 kilocycles per second, produces in its output a square wave signal with a frequency of 12.5 kilocycles per second for transmission to the nand-gate circuit 35 and the filter and buffer circuit 25.

The filter and buffer circuit 25 receives the square wave signal with a frequency of 12.5 kilocycles per second and produces therefrom a sine wave signal with a frequency of 12.5 kilocycles per second. There is a constant phase relationship between the square wave input signal fed to the filter and buffer circuit 25 and the sine wave output signal produced by the filter and buffer circuit 25. The phase relationship is constant because of the transfer function of the low pass filter 70.

At this time, the filter and buffer circuit transmits simultaneously and continuously the sine wave signal with a frequency of 12.5 kilocycles to the gate circuits 120–122 of the sample and hold circuit 30. As previously discussed, square wave pulses are transmitted by the flip-flop counter circuits 60–62 to the nand-gate 35 over the conductors 65–67, respectively. When the pulses transmitted over the conductors 65–67 are simultaneously impressed on the input circuits of nand-gate circuit 35, the nand-gate circuit 35 changes its state to produce in its output a reference pulse signal. Hence, the nand-gate circuit 35 transmits over the conductor 72 a square wave reference signal with a frequency of 12.5 kilocycles per second, which originates from the same square wave signal that is converted to produce the sine wave signal to be sampled.

The reference pulse produced in the output of the nand-gate circuit 35 is transmitted over the conductor 72 to the variable delay circuit 73 of the variable and fixed delay circuit 40. In the output of the variable delay circuit 73 is generated a pulse $P_1$, which has its rising edge formed coincident with the falling edge of the reference pulse produced by the nand-gate circuit 35. The pulse width of the pulse $P_1$ is regulated by the adjustment of the voltage control circuit 80. The pulse $P_1$ is transmitted to the succeeding fixed delay circuit 74 over the conductor 86 and to the circuit 90 of the variable delay circuit 73 for the generation of the sine sampling pulse $Ps_1$.

Coincident with the fall of the pulse $P_1$ is the rise of the sine sampling pulse $Ps_1$, which is generated across the resistor 98 of the variable delay circuit 73. The sine sampling pulse $Ps_1$ has a fixed width or time duration, such as .4 to .5 microseconds. By regulating the voltage output of the voltage control circuit 80, the pulse width of the pulse $P_1$ is adjusted. Therefore, the location of the sampling pulse $Ps_1$ can be varied within a region of interest with respect to the sine wave signal transmitted to the sample and hold circuit 30. The sine wave sampling pulse $Ps_1$ is transmitted over the conductor 53 to the gating circuit 120.

While the sine sampling pulse $Ps_1$ is transmitted over the conductor 53 to the gate circuit 120, the gate circuit 120 conducts and the sampled voltage of the sine wave signal charges the capacitor 130. The sampled charge on the capacitor 130 is fed to the D.C. amplifier 140, which impresses on the conductor 50 a constant and continuous D.C. potential of a value described as K sine V.

Coincident with the fall of the pulse $P_1$ is the rise of the pulse $P_2$ which is produced by the fixed delay circuit 74. As previously described, the pulse $P_1$ is transmitted from the variable delay circuit 73 to the succeeding fixed time delay circuit 74 over the conductor 86. The pulse $P_2$, which is transmitted over the conductor 105 to the succeeding fixed delay circuit 75, has a constant pulse width. The pulse $P_2$ is also transmitted over the conductor 105 to the sampling pulse forming circuit of the fixed delay circuit 74. As the pulse $P_2$ falls, the cosine sampling pulse $Ps_2$ rises. The cosine sampling pulse $Ps_2$ is transmitted over the conductor 54 to the gating circuit 121 of sample and hold circuit 30. As previously described, the time duration for the cosine sampling pulse $Ps_2$ is always constant, such as .4 to .5 microseconds, and has a constant phase delay with respect to the sine sampling pulse $Ps_1$. The sampling pulse $Ps_2$ is precisely 90 electrical degrees out of phase with the sampling pulse $Ps_1$. The basis for the 90 electrical degrees is the period of the sine wave signal.

While the cosine sampling pulse $Ps_2$ is transmitted over the conductor 54 to the gate circuit 121, the gate circuit 121 conducts and the sampled voltage of the sine wave signal charges the capacitor 131. The sampled charge on the capacitor 131 is fed to the D.C. amplifier 141, which impresses on the conductor 51 a constant and continuous D.C. potential of a value described as K cosine $\alpha$V.

At the time the pulse $P_2$ falls, the pulse $P_3$ rises. The pulses $P_2$ is transmitted to the fixed delay circuit 75 over the conductor 105. The pulse $P_3$, which is produced by the fixed delay circuit 75, has a constant pulse width. As the pulse $P_3$ falls, the—sine sampling pulse $Ps_3$ rises. The—sine sampling pulse $Ps_3$ is also produced by the fixed delay circuit 74 and is transmitted over the conductor 55 to the gating circuit 122. The time duration for the—sine sampling pulse $Ps_3$ is always constant, such as .4 to .5 microseconds, and has a constant phase delay with respect to the cosine sampling pulse $Ps_2$. The sampling pulse $Ps_3$ is precisely 90 electrical degrees out of phase with the sampling pulse $Ps_2$. The basis for the 90 electrical degrees is the period of the sine wave signal.

While the cosine sampling pulse $Ps_3$ is transmitted over the conductor 55 to the gate circuit 122, the gate circuit 122 conducts and the sampled voltage of the sine wave signal charges the capacitor 132. The sampled charge on the capacitor 132 is fed to the D.C., amplifier 142, which impresses on the conductor 52 a constant and continuous D.C. potential of a value described as —K sine V.

It is to be understood that variations and modifications of the embodiment of the invention disclosed herein may be resorted to without departing from the spirit of the invention and the scope of the appended claims.

Having thus described my invention, what I claim as new and desire to protect by Letters Patent is:

1. A sine-cosine function generator comprising a circuit for producing a sine wave signal, a plurality of sampling circuits connected to said circuit for receiving said sine wave signal and for producing therefrom sampled sine wave potentials, a sampling control circuit connected to each of said sampling circuits for controlling the sampling time of its associated sampling circuit, said sampling control circuits being connected in cascade to produce sampling pulses in succession for operating sequentially said sampling circuits to sample said sine wave signal at equal periodic intervals, and means connected to said sampling circuits for receiving therefrom sampled sine wave potentials and for producing from said sampled sine wave potentials control voltages with magnitudes describing sine-cosine functions.

2. A sine-cosine function generator as claimed in claim 1 wherein sampling control circuits produce triggering pulses for operating in timed sequence its succeeding sampling control circuit.

3. A sine-cosine function generator as claimed in claim 2 wherein said triggering pulses have the same fixed pulse width and wherein the falling edge of a triggering pulse produced in each of said sampling control circuits initiates the rising edge of a triggering pulse in the succeeding sampling control circuit.

4. A sine-cosine function generator as claimed in claim 2 wherein the triggering pulse produced in the leading sampling control circuit has the pulse width thereof regulated by adjusting a voltage control circuit and wherein the triggering pulses produced by each of the succeeding sampling control circuits have the same fixed pulse width and wherein the falling edge of a triggering pulse produced in each of said sampling control circuits initiates the rising edge of a triggering pulse in the succeeding sampling control circuit.

5. A sine-cosine function generator as claimed in claim 4 wherein the falling edge of a triggering pulse produced in each of said sampling control circuits also initiates the rising edge of the sampling pulse produced by its associated sampling control circuit.

6. A sine-cosine function generator as claimed in claim 5 wherein said sampling pulses are equal in pulse width.

7. A sine-cosine function generator as claimed in claim 6 and comprising a reference pulse producing circuit connected to said leading sampling control circuit for transmitting thereto a reference pulse, the falling edge of said reference pulse initiating the rising edge of the triggering pulse produced by said leading sampling control circuit.

8. A sine-cosine function generator as claimed in claim 7 wherein said circuit for producing said sine wave signal comprises a square wave oscillator, a countdown circuit connected to said oscillator for receiving therefrom said square wave signal and producing therefrom a square wave signal of a reduced frequency, said countdown circuit including a plurality of flip-flop circuits connected in cascade, said reference pulse producing circuit being connected to said flip-flop circuits for producing said reference pulse signal under the control of the square wave pulses produced by said flip-flop circuits.

9. A sine-cosine function generator as claimed in claim 8 wherein said circuit for producing said sine wave signal includes a filter circuit connected to said countdown circuit that receives the square wave signal from said countdown circuit and produces therefrom said sine wave signal, said sine wave signal being of the same frequency as the square wave signal received by said filter circuit and having a fixed phase relationship with the square wave signal received by said filter circuit.

10. A sine-cosine function generator as claimed in claim 9 wherein said sine wave signal is sampled by said sampling circuits within the same period of said sine wave.

11. A sine-cosine function generator as claimed in claim 1 wherein said circuit for producing said sine wave signal comprises square wave signal generator means and means for converting said square wave signals therefrom into said sine wave signal, said sampling control circuits being controlled by signals from said square wave signal generator means.

12. A sine-cosine function generator comprising a first circuit for producing a sine wave signal, said first circuit including a square wave signal generator and means for converting square wave signals therefrom into said sine wave signal, a plurality of sampling circuits connected to said first circuit for receiving said sine wave signal and for producing therefrom sampled sine wave potentials, a sampling control circuit connected to each of said sampling circuits for controlling the sampling time of its associated sampling circuit, said sampling control circuits being connected to said square wave signal generator and interconnected to produce sampling pulses in succession for operating sequentially said sampling circuits to sample said sine wave signal at equal periodic intervals, and means connected to said sampling circuits for receiving therefrom sampled sine wave potentials and for producing from said sampled sine wave potentials control voltages with magnitudes describing sine-cosine functions.

13. The sine-cosine function generator of claim 12 wherein said square wave signal generator further includes a countdown circuit for dividing the frequency of the square wave signal applied to said means for converting said square wave signals into said sine wave signal, said countdown circuit providing a control signal to said sampling control circuits with a time duration which is a fraction of the period of said sine cosine signal.

References Cited

UNITED STATES PATENTS

| | | | |
|---|---|---|---|
| 2,926,852 | 3/1960 | Bennett | 235—189 |
| 2,963,646 | 12/1960 | Hicks et al. | 328—135 X |
| 3,217,152 | 11/1965 | Dahlin | 235—197 |
| 3,384,738 | 5/1968 | Warrick | 235—189 |

FOREIGN PATENTS

| | | |
|---|---|---|
| 149,630 | 11/1961 | U.S.S.R. |

MALCOLM A. MORRISON, Primary Examiner

ROBERT W. WEIG, Assistant Examiner

U.S. Cl. X.R.

235—197